(12) United States Patent
Welch et al.

(10) Patent No.: US 8,302,907 B2
(45) Date of Patent: Nov. 6, 2012

(54) HYBRID TORQUE BOX FOR A THRUST REVERSER

(75) Inventors: John M. Welch, Wichita, KS (US); Henry Arnold Schaefer, Wichita, KS (US); Matthew Scott Tymes, Wichita, KS (US); Michael Patrick Urban, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 457 days.

(21) Appl. No.: 12/717,501

(22) Filed: Mar. 4, 2010

(65) Prior Publication Data

US 2011/0215193 A1    Sep. 8, 2011

(51) Int. Cl.
*F02K 1/54* (2006.01)
(52) U.S. Cl. .................................. 244/110 B
(58) Field of Classification Search .............. 244/110 B, 244/53 R, 12.5, 23 D, 119, 117 R, 131, 54, 244/129.5, 129.4, 129.1; 52/834, 843, 844, 52/848; 60/226.2, 230; 239/265.29; 248/74.1, 248/230.1, 230.4, 231.51, 216.5
See application file for complete search history.

(56) References Cited

U.S. PATENT DOCUMENTS

| | | | |
|---|---|---|---|
| 4,998,409 A * | 3/1991 | Mutch | 60/226.2 |
| 5,239,822 A * | 8/1993 | Buchacher | 60/226.2 |
| 7,866,142 B2 * | 1/2011 | Beardsley et al. | 60/226.2 |
| 8,136,341 B2 * | 3/2012 | Stephan et al. | 60/226.2 |
| 8,172,176 B2 * | 5/2012 | Welch et al. | 244/110 B |
| 8,205,825 B2 * | 6/2012 | Huggins et al. | 244/54 |
| 2004/0159091 A1 * | 8/2004 | Sternberger et al. | 60/226.2 |
| 2004/0159741 A1 * | 8/2004 | Sternberger et al. | 244/110 B |
| 2007/0294996 A1 * | 12/2007 | Stephan et al. | 60/226.2 |
| 2009/0212155 A1 * | 8/2009 | Huggins et al. | 244/54 |
| 2010/0193632 A1 * | 8/2010 | Welch et al. | 244/110 B |
| 2011/0062279 A1 * | 3/2011 | Welch et al. | 244/54 |
| 2012/0097761 A1 * | 4/2012 | Vache et al. | 239/265.19 |

OTHER PUBLICATIONS

U.S. Appl. No. 12/558,042, filed Sep. 11, 2009, Welch, John et al.

* cited by examiner

*Primary Examiner* — Tien Dinh
*Assistant Examiner* — Michael A Fabula
(74) *Attorney, Agent, or Firm* — Hovey Williams LLP

(57) ABSTRACT

A hybrid torque box comprising a plurality of composite tubes and metal fittings attached together in alternating succession and configured to attach a thrust reverser to an engine fan case of an aircraft. The hybrid torque box may be substantially hollow and may comprise two V-blades for attaching the torque box to the engine fan case. The hybrid torque box may also be attached to or integral with a bull nose fairing configured for attachment with a cascade of the thrust reverser. Furthermore, the hybrid torque box may comprise and/or attach to a cowl interface flange configured for interfacing with an outer cowl of the thrust reverser.

16 Claims, 12 Drawing Sheets

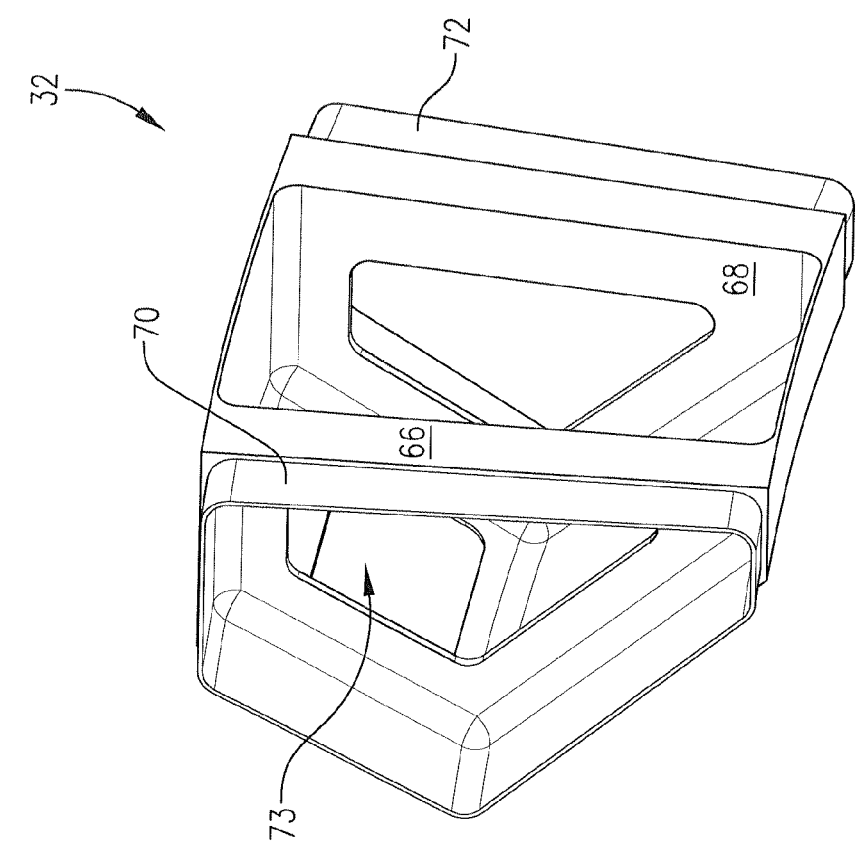
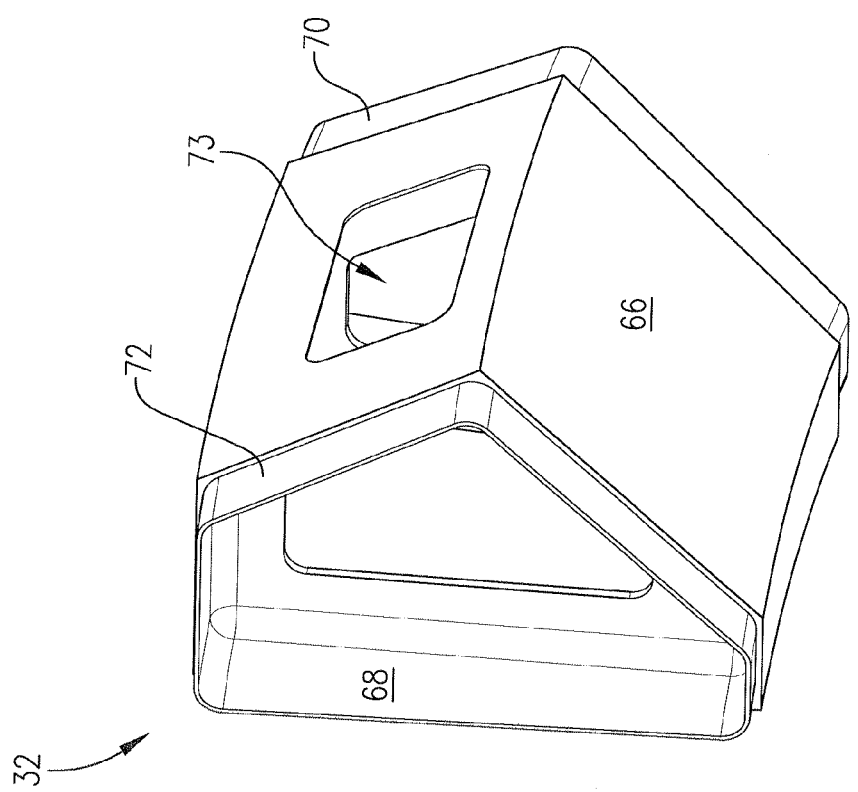

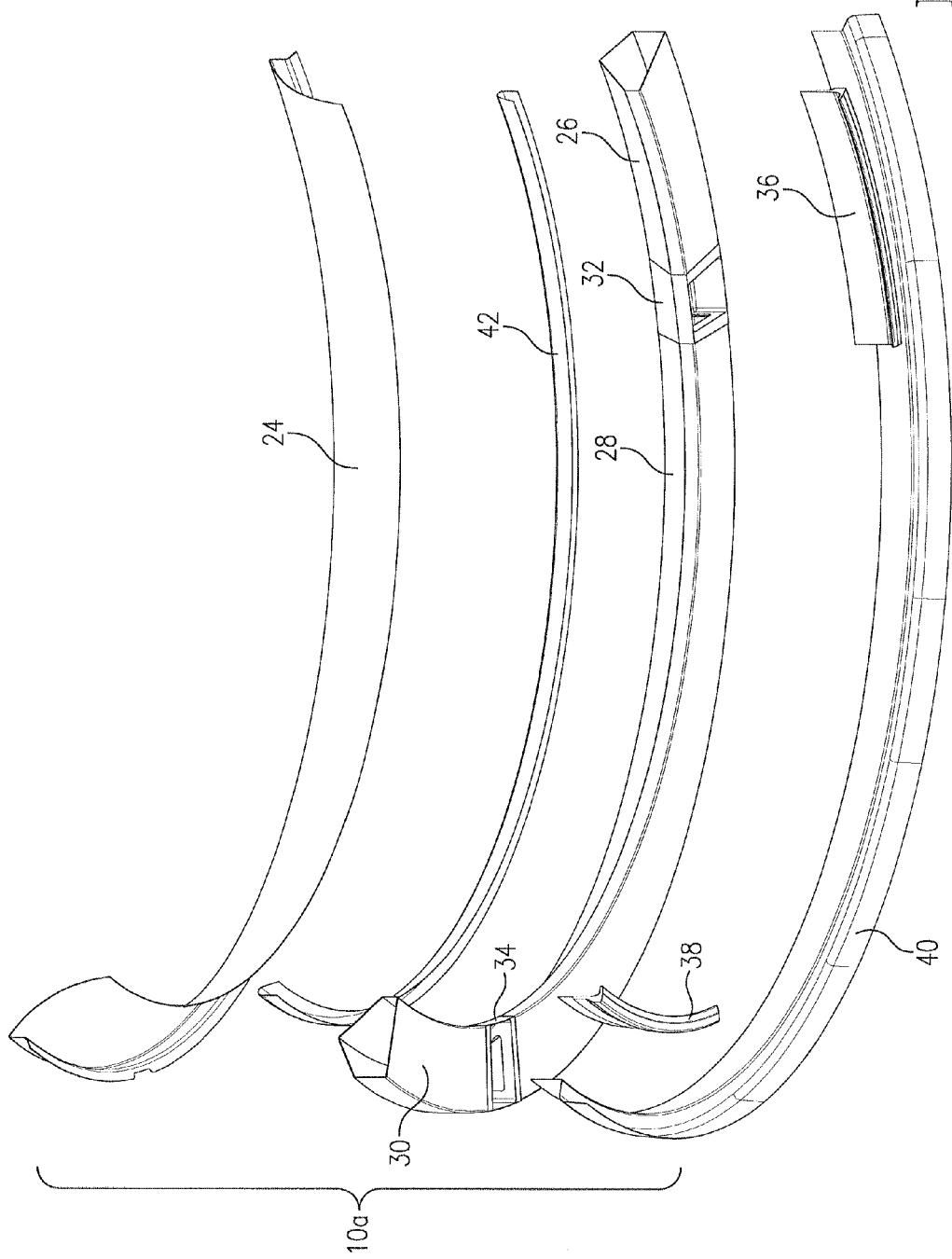

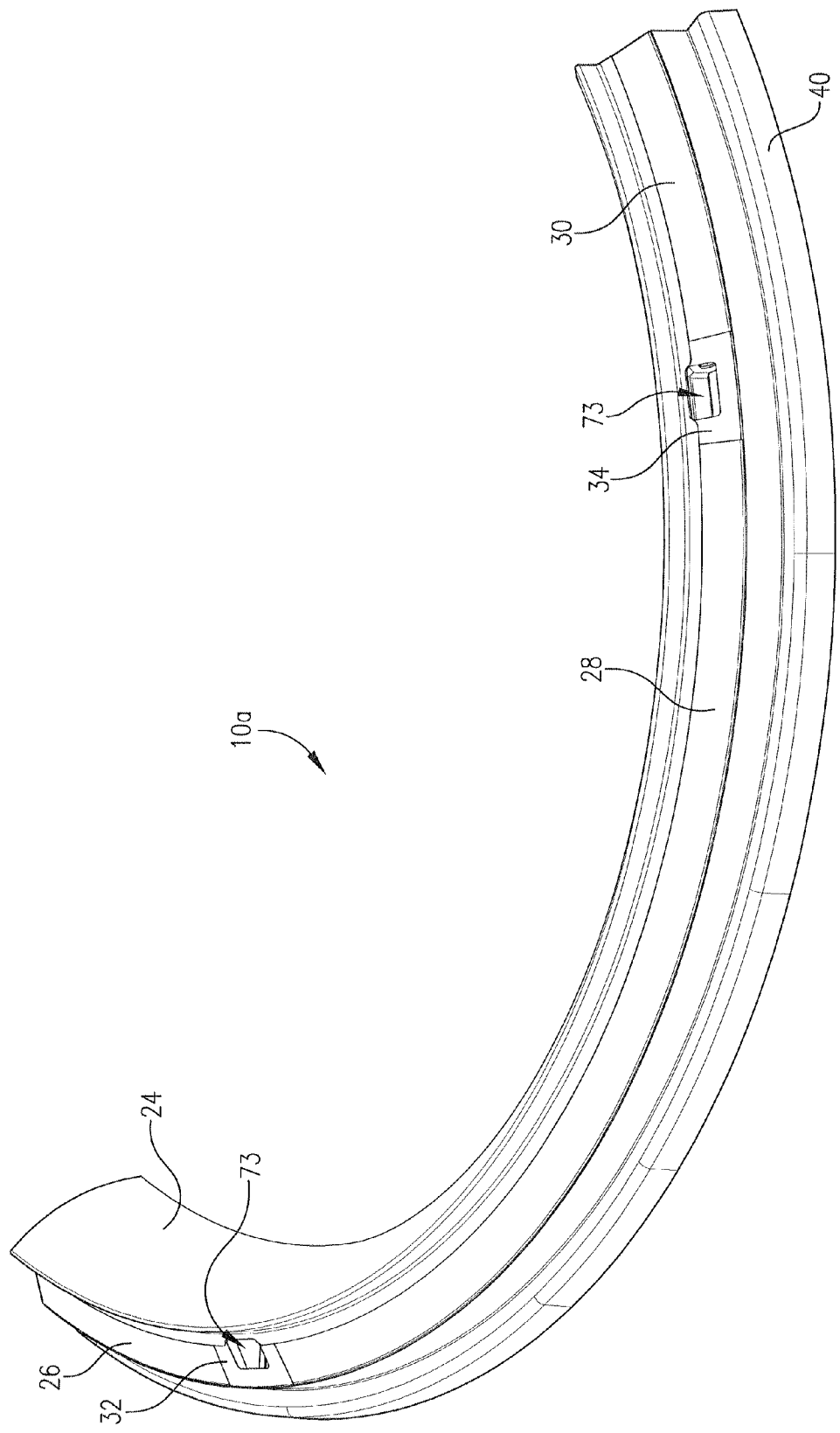

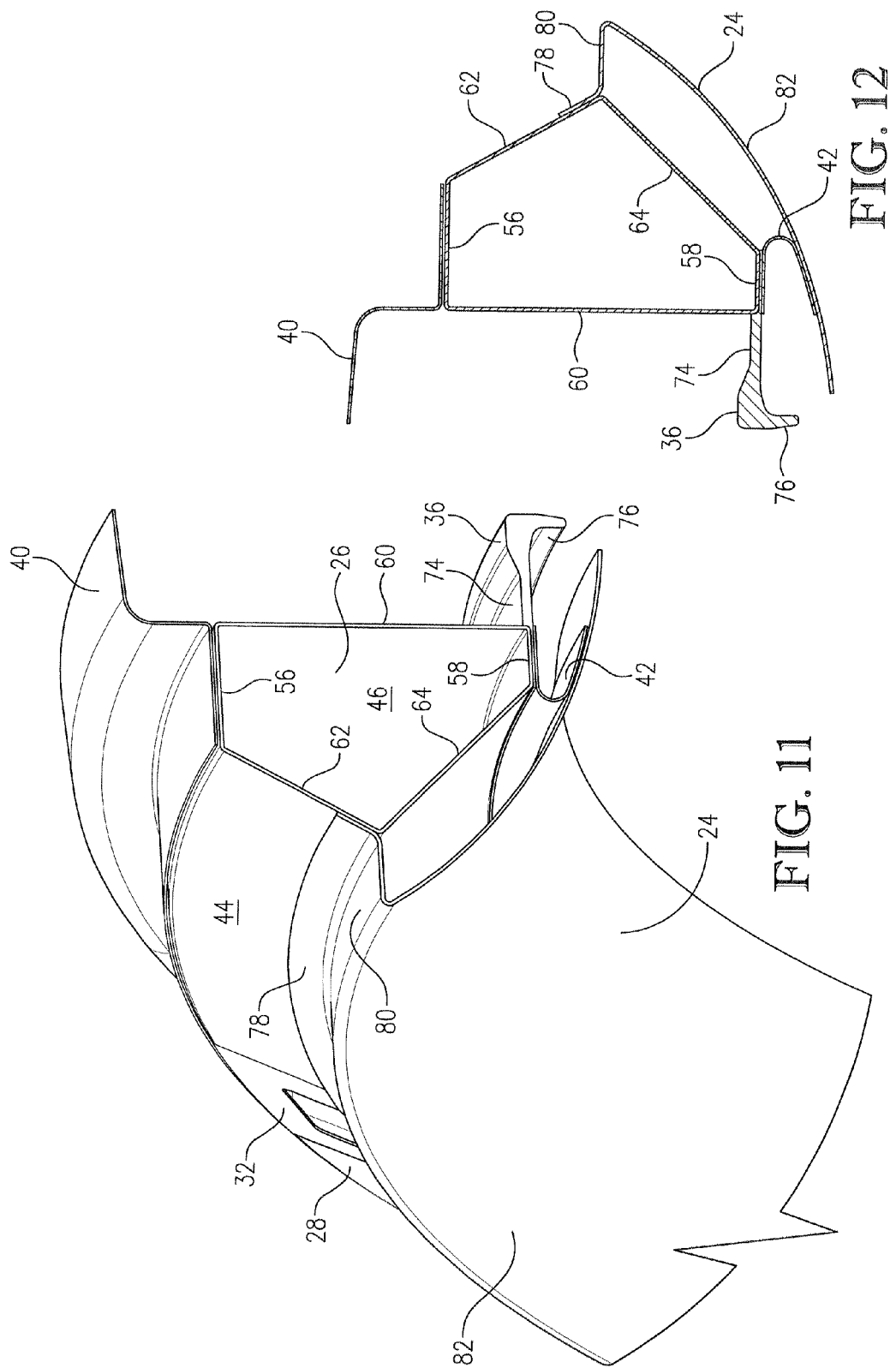

HYBRID TORQUE BOX FOR A THRUST REVERSER

BACKGROUND

1. Field

The present invention relates to aircraft components. More particularly, the invention relates to a composite and metal hybrid torque box and a method of constructing and attaching the hybrid torque box to a thrust reverser and an engine fan case.

2. Related Art

Aircraft equipped with under-wing engines generally contain thrust reverser units that are joined to an engine fan case via one or more torque boxes. The torque boxes may each provide mounting provisions for thrust reverser actuators and fixed structural connection between a hinge beam in a top half of the thrust reverser unit and a latch beam in the bottom half of the unit.

Torque boxes are traditionally made of metal and are expensive, heavy, and require multiple attached stiffening members to remain structurally effective. Composite torque boxes proposed to reduce weight have either been one-piece tubular structures or open-sectioned, composite, integrally-stiffened rings. The one-piece tubular structures typically require local composite ply build-ups or internal stiffening at critical load areas. Mounting actuator components and fittings onto the one-piece tubular structures is complicated due to inherently restrictive internal access. Open-sectioned, composite, integrally-stiffened rings mitigate the internal access issues of the one-piece tubular structures, but are costly, require intricate fabrication details, are difficult to inspect, and sacrifice some torsional structural efficiency compared to one-piece tubular structures. Additionally, these open-sectioned rings generally require a multitude of molds to define various stiffening details.

Accordingly, there is a need for torque boxes that overcome the limitations of the prior art.

SUMMARY

One embodiment of the present invention is a hybrid torque box comprising a plurality of composite tubes and metal fittings attached together in alternating succession and configured to attach at least one half of a thrust reverser to an engine fan case of an aircraft. For example, a first composite tube may be attached to a first metal fitting, the first metal fitting may be additionally attached to a second composite tube, the second composite tube may be additionally attached to a second metal fitting, and the second metal fitting may be additionally attached to a third composite tube.

The hybrid torque box may be substantially hollow and may additionally comprise two V-blades for attaching the torque box to the engine fan case. In some embodiments of the invention, the V-blades may be attached to the first composite tube and the third composite tube. The hybrid torque box may also be attached to or integral with a bull nose fairing configured for attachment with a cascade of the thrust reverser. Furthermore, the hybrid torque box may comprise and/or attach to a cowl interface flange configured for interfacing with an outer cowl of a first half of the thrust reverser. A second substantially identical torque box may be configured to attach an outer cowl of a second half of the thrust reverser to the entire fan case.

A method of manufacturing a composite torque box of the present invention may comprise forming a C-shaped composite tube and dividing the C-shaped composite tube into a plurality of composite tubes. The method may also comprise forming a plurality of metal fittings and attaching the metal fittings in alternating succession with the composite tubes, so that the metal fittings are sandwiched between and interface with the composite tubes. The V-blades, cowl interface flange, and/or the bull nose fairing may then be attached to the composite tubes and/or the metal fittings to provide means for attaching the fan case and thrust reverser to the torque box.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein:

FIG. 6 is a perspective view of a metal fitting of the torque box of FIG. 1;

FIG. 7 is another perspective view of the metal fitting of the torque box of FIG. 1;

FIG. 9 is another exploded perspective view of the torque box of FIG. 1 including V-blade fittings, a bull nose fairing, and a cowl interface flange;

FIG. 10 is a rear perspective view of the torque box of FIG. 1;

FIG. 11 is a fragmentary perspective view of the torque box of FIG. 1;

FIG. 12 is a cross-sectional view of the torque box of FIG. 1;

Figure 1:
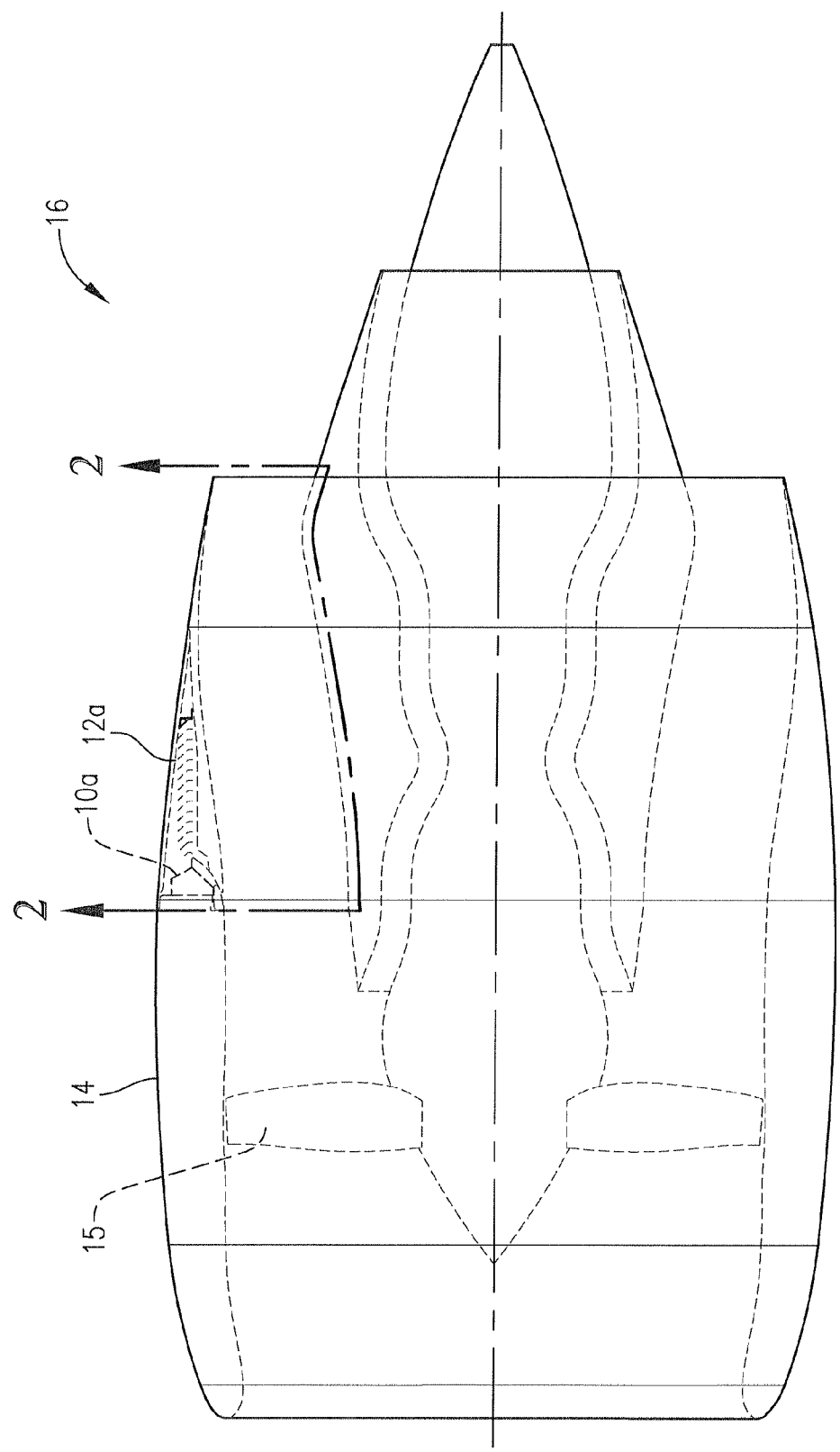
FIG. 1 is an elevational view of an aircraft nacelle comprising a thrust reverser, a fan case, and a torque box constructed according to an embodiment of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

FIGS. 1-4 illustrate hybrid torque boxes 10a, 10b for attaching thrust reverser components 12a, 12b to an engine fan case 14 of an aircraft nacelle 16. An engine fan 15 within the aircraft nacelle 16 may be surrounded by the fan case 14, which may interface with the torque boxes 10a, 10b. The torque boxes 10a, 10b may be attached to the thrust reverser components 12a, 12b, including one or more of a plurality of hinge beams 17 and latch beams 18, a cascade 20, and an outer cowl 22, as illustrated in FIGS. 1-4.

Figure 3:
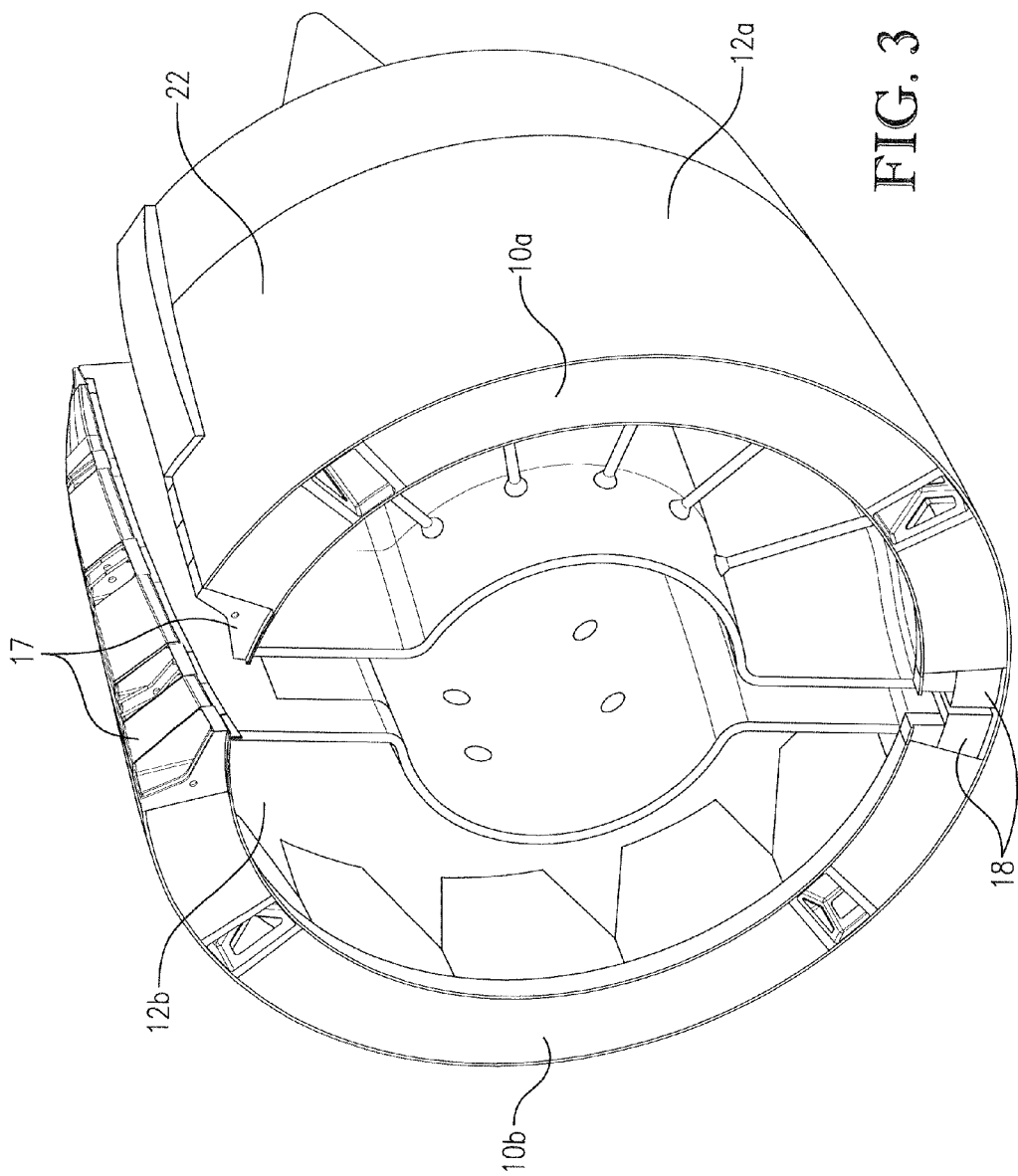
FIG. 3 is a perspective view of two torque boxes and two thrust reverser components of the nacelle of FIG. 1.

As illustrated in FIG. 3, the torque boxes 10a, 10b are substantially C-shaped or semi-circular shaped and attach to a forward end of the thrust reverser components 12a, 12b. The torque boxes 10a, 10b may be independent structures that may act as a single structure when latched together with the latch beams 18 to support loads of both the fan case 14 and the reverser thrust components 12a, 12b. The thrust reverser components 12a, 12b may each be one half of a thrust reverser of the nacelle 16. The torque boxes 10a, 10b are substantially identical to each other, and thrust reverser components 12a, 12b are substantially identical to each other, therefore, only torque box 10a and thrust reverser component 12a are described in detail below.

The torque box 10a, as illustrated in FIGS. 1-4 and 8-12, may comprise a plurality of composite tubes 26,28,30, a plurality of metal fittings 32,34, and one or more V-blade fittings 36,38. Furthermore, the torque box 10a may comprise, be integral with, or attach to a cowl interface flange 40 and/or a bull nose fairing 24, with an attachment component 42 attaching the bull nose fairing 24 to the V-blade fittings 36,38, the composite tubes 26-30, and/or the metal fittings 32,34. The bull nose fairing 24 may also be attached to the cascade 20 of the thrust reverser component 12a.

Figure 4:
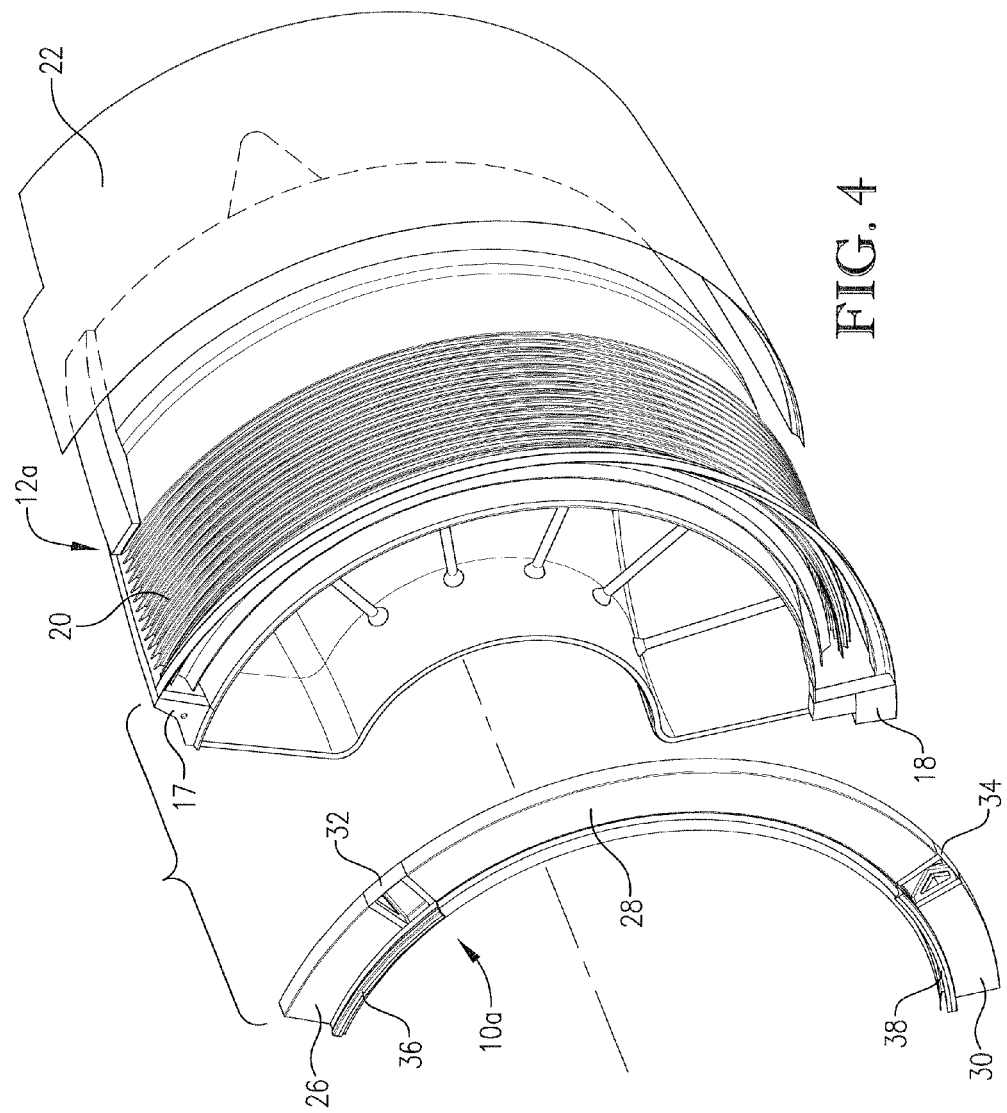
FIG. 4 is an exploded perspective view of one of the thrust reverser components and one of the torque boxes of FIG. 3.
Figure 5:
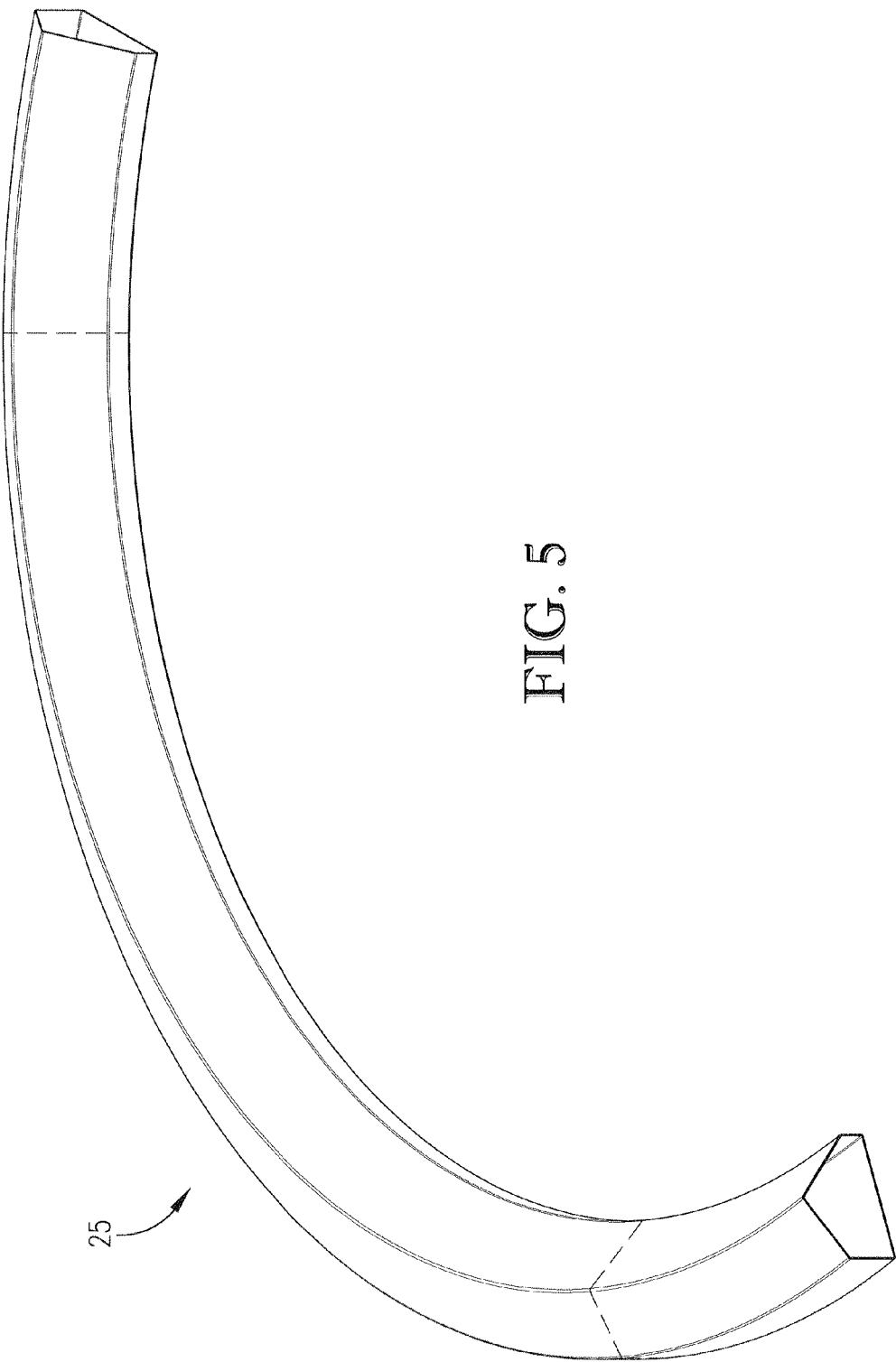
FIG. 5 is a perspective view of a C-shaped composite tube used to form a plurality of composite tubes of the torque box of FIG. 1.
Figure 8:
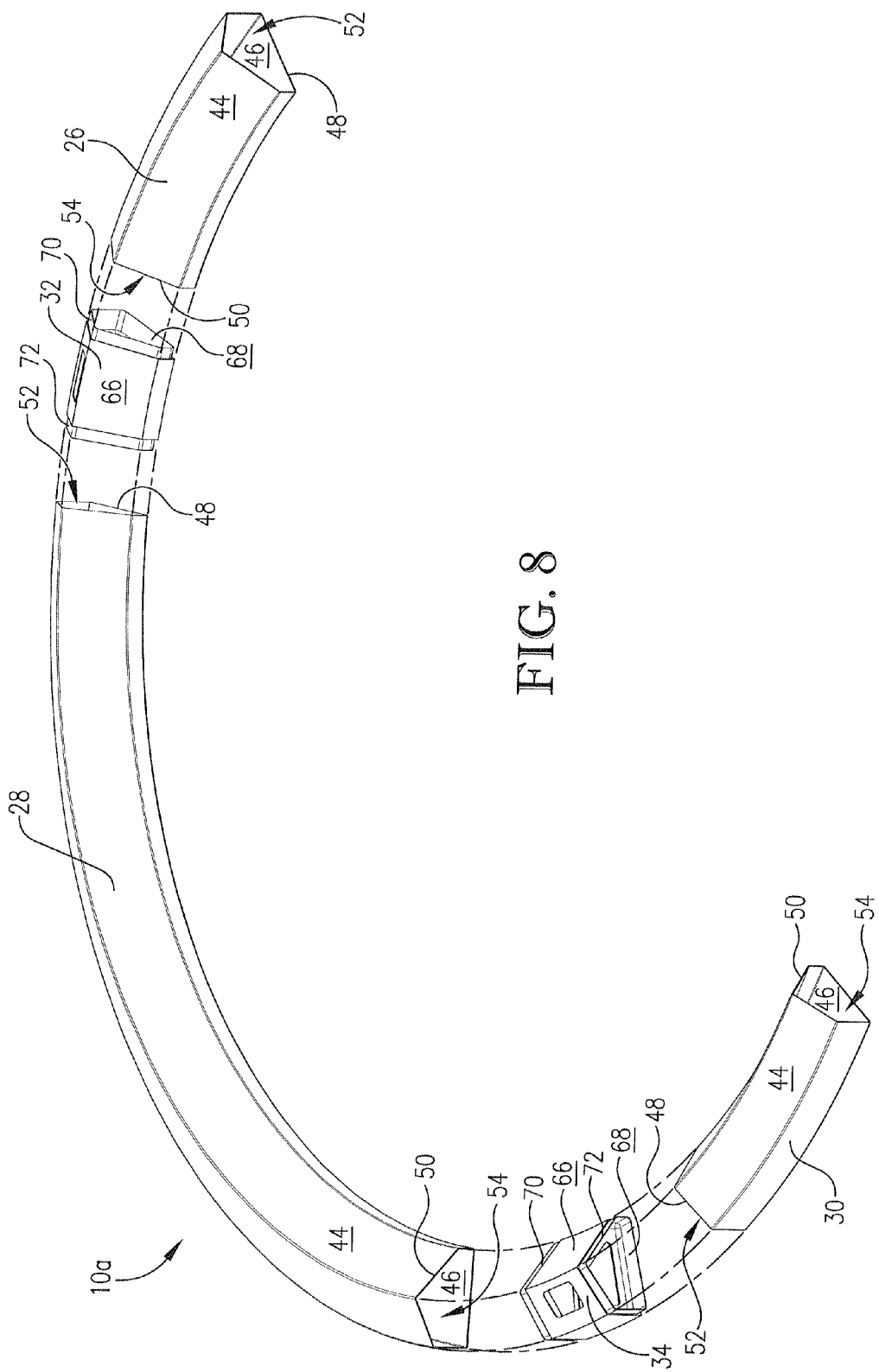
FIG. 8 is an exploded perspective view of the torque box of FIG. 1.

The plurality of composite tubes 26-30 may be formed from one generally C-shaped composite tube 25, as illustrated in FIG. 5, made from cured composite material and divided into a plurality of segments. The composite tubes 26-30 may comprise a first composite tube 26, a second composite tube 28, and a third composite tube 30, as illustrated in FIGS. 4 and 8. In some embodiments of the invention, the first and third composite tubes 26,30 may be shorter in length than the second composite tube 28 positioned therebetween.

As illustrated in FIG. 8, each of the composite tubes 26-30 may have an outer surface 44, an inner surface 46, a first end 48, and a second end 50 opposite of the first end 48. The first and second ends 48,50 each form boundaries of a first opening 52 and an opposing second opening 54 of the composite tubes 26-30, as illustrated in FIG. 8. Furthermore, the composite tubes 26-30 may have any cross-sectional shape. For example, as illustrated in FIGS. 11-12, the composite tubes may have a cross-sectional shape having five sides corresponding with five faces positioned at various angles and having various lengths. The five sides may include a top side 56, a bottom side 58 substantially opposite of the top side 56, an outward-facing side 60 extending between the bottom and top sides 56,58, an upper inward-facing side 62 extending from the top side 56, and a lower inward-facing side 64 extending from the upper inward-facing side 62 to the bottom side 58. In alternative embodiments of the invention, the upper inward-facing side 62 and the lower inward-facing side 64 may be replaced by one inward-facing side extending from the top side 56 to the bottom side 58, and/or the bottom side 58 may be removed and the outward-facing side 60 may substantially mate with the lower inward-facing side 64.

As illustrated in FIGS. 6-8, the metal fittings 32,34 may be substantially hollow monolithic metal fittings, such as aluminum metal fittings or the like, having a cross-sectional shape substantially matching the cross sectional shape of the composite tubes 26-30. For example, the metal fittings 32,34 may also have five sides corresponding with five faces of the metal fittings 32,34. However, both the composite tubes 26-30 and the metal fittings 32,34 may have more or less sides or faces without departing from the scope of the invention. The metal fittings 32,34 may also comprise an outer surface 66 and an inner surface 68, with at least a portion of the outer surface 66 sized and configured to be flush with the outer surface 44 of at least one of the composite tubes 26-30. The metal fittings 32,34 may comprise opposing first and second end portions 70,72 shaped to mate with the inner surfaces 46 of the composite tubes 26-30 when slid inside the composite tubes 26-30 via the first or second openings 52,54. A portion of the outer surface 66 of the metal fittings 32,34 corresponding with the end portions 70,72 may therefore contact the inner surface 46 of at least one of the composite tubes 26-30 while the outer surface 66 of the metal fittings 32,34 not corresponding with the end portions 70,72 may be positioned substantially flush with the outer surface 44 of at least one of the composite tubes 26-30.

The metal fittings 32,34 may have one or more openings 73 formed therein extending through various faces thereof. At least one of the openings 73 may be configured such that an actuator (not shown) may be placed therethrough and configured to extend therefrom. For example, the actuator housed within and/or mounted to the metal fitting may be a thrust reverser actuator configured for pushing or sliding a translating portion of the thrust reverser component 12a aftward and away from the torque box 10a. In an alternative embodiment of the invention, the actuator may pass or extend through one or more of the openings 73 but may be mounted to another component of the nacelle 16.

Figure 2:
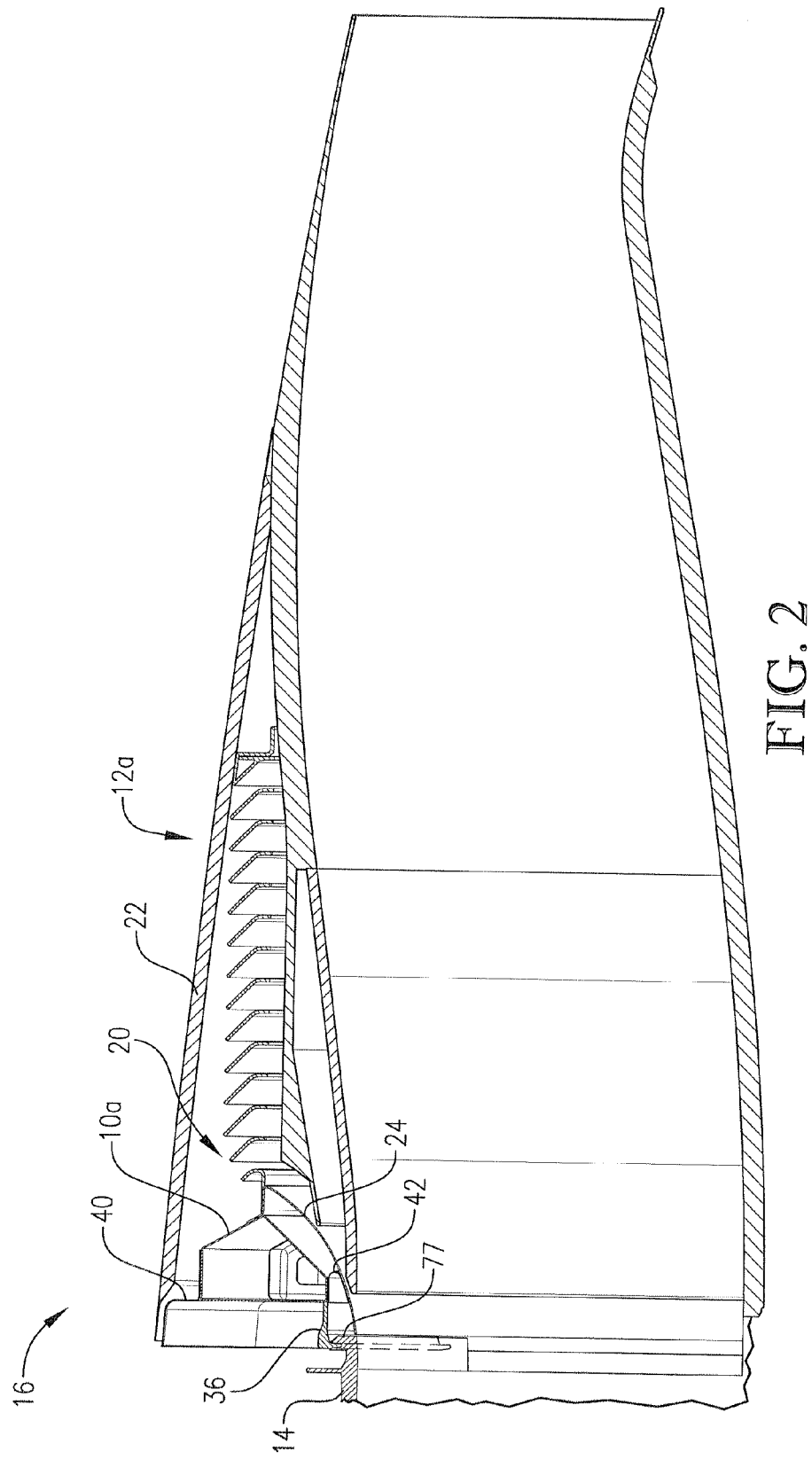
FIG. 2 is a cross-sectional, fragmentary view of the nacelle and torque box of FIG. 1.

The V-blade fittings 36,38, as illustrated in FIGS. 2, 4, 9, 11, and 12, may comprise a first V-blade fitting 36 and a second V-blade fitting 38. The V-blade fittings 36,38 may be fixedly attached to at least one of the composite tubes 26-30, the attachment component 42, and/or the bull nose fairing 24 and may interface or mate with the fan case 14. Each of the V-blade fittings 36,38 may be formed of metal, may be curved to match the general shape of the torque box 10a, and may have a substantially L-shaped cross-section including a first leg 74 and a second leg 76, as illustrated in FIGS. 11-12. The second leg 76 of the V-blade fittings 36,38 may interface or mate with the fan case 14, substantially hooking onto or nestling into an attachment portion 77 of the fan case 14, as illustrated in FIG. 2. The first leg 74 may be bonded or mechanically attached to the first or third composite tube 26,30, the attachment component 42, and/or the bull nose fairing 24. For example, a portion of the first leg 74 of the first V-blade fitting 36 may be sandwiched between the bottom side 58 of the first composite tube 26 and the attachment component 42, while a portion of the first leg 74 of the second V-blade fitting 38 may be sandwiched between the bottom side 58 of the third composite tube 30 and the attachment component 42, as illustrated in FIG. 12. In some embodiments of the invention, no V-blade fittings are attached to the second composite tube 30 or the metal fittings 32,34 and the length of the V-blade fittings 36,38 may correspond with the lengths of the first and/or third composite tubes 26,30. However, in other alternative embodiments of the invention, only one of the V-blade fittings 36,38 is attached to and/or part of the torque box 10*a*, with the length of the V-blade fitting extending substantially the entire length of the C-shaped torque box 10*a*.

The cowl interface flange 40, as illustrated in FIGS. 9-12, may be generally C-shaped to match the length and curvature of the torque box 10*a* and may be formed of metal. The cowl interface flange 40 may be integral or attached to the composite tubes 26-30 and/or the metal fittings 32,34 and may additionally attach to and/or interface with the outer cowl 22. For example, the cowl interface flange 40 may be attached to the top side 56 of the composite tubes 26-30 and/or the corresponding side of the metal fittings 32,34.

The bull nose fairing 24, as illustrated in FIGS. 9-12, may be formed of composite material and may be bonded to and/or formed integral with the composite tubes 26-30. The bull nose fairing 24 may also be attached to the cascade 20 of the thrust reverser component 12*a*. In some embodiments of the invention, the bull nose fairing 24 may have a first portion 78 attached to and resting flush against the upper inward-facing side 62 of the composite tubes 26-30 and/or the corresponding side of the metal fittings 32,34. The bull nose fairing 24 may further comprise a second portion 80 jutting aftward from the first portion 78 for attaching to the cascade 20. The bull nose fairing 24 may also comprise a third portion 82 extending from the second portion 80 in a curved, forward direction around but spaced apart from the lower inward-facing side 64 and the bottom side 58 of the composite tubes 24-30 and/or the corresponding sides of the metal fittings 32,34. In some embodiments of the invention, the attachment component 42 may be attached to the third portion 82 of the bull nose fairing 24 using any attachment or bonding method, thereby securing the third portion 82 of the bull nose fairing 24 a distance apart from the lower inward-facing side 64 and the bottom side 58 of the composite tubes 24-30. In some embodiments of the invention, however, the attachment component 42 may be integral with either the bull nose fairing 24, the composite tubes 24-30, and/or the metal fittings 32,34.

Some embodiments of the invention may further comprise a fire wall (not shown) attached to or integral with at least one of the composite tubes and metal fittings. For example, a fire-resistant material may be applied to the outward facing side 60 of the composite tubes 26-30 on the outer surface 44 thereof and to the corresponding side of the metal fittings 32,30 on the outer surface 66 thereof.

A method for manufacturing the torque box 10*a* described above may begin by wrapping composite material around a mandrel (not shown) configured to match the shape and size and curvature of the completed torque box 10*a*, curing the composite material, and then removing the mandrel. Next, the cured composite tube 25 may be cut into a plurality of sections, including the composite tubes 26-30. Then the composite tubes 26-30 may be attached or bonded to metal fittings 32,34 in alternating succession. Next, the V-blade fittings 36,38, the cowl interface flange 40, and the bull nose fairing 24 may be attached to the composite tubes 26-30.

Once the hybrid torque box 10*a* is manufactured, a method of attaching the torque box 10*a* to an aircraft nacelle may comprise attaching a forward end of the cascade 20 to the bull nose fairing 24 and placing the V-blade fittings 36,38 in contact with the fan case 14. The method may also comprise mating the outer cowl 22 proximate to or in contact with the cowl interface flange 40.

Figure 13:
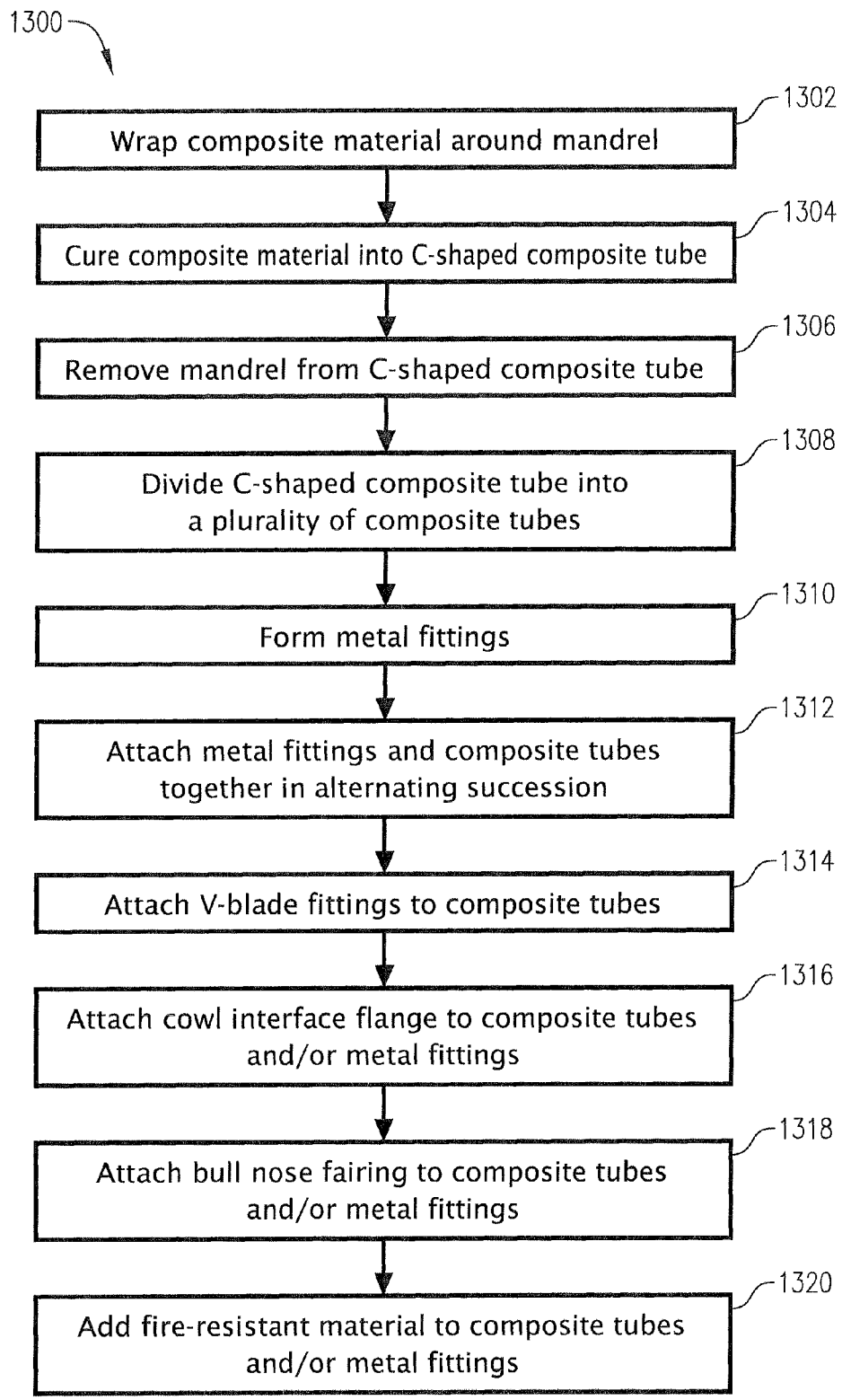
FIG. 13 is a flow chart of a method of manufacturing a torque box according to an embodiment of the present invention.

The flow chart of FIG. 13 depicts the steps of exemplary methods of the invention in more detail. In some alternative implementations, the functions noted in the various blocks may occur out of the order depicted in FIG. 13. For example, two blocks shown in succession in FIG. 13 may in fact be executed substantially concurrently, or the blocks may sometimes be executed in the reverse order depending upon the functionality involved.

The method 1300 may first comprise wrapping composite material around a mandrel, as depicted in step 1302. The mandrel (not shown) may be configured to match the shape, size and curvature of the completed torque box 10*a*. The material may be wrapped around the mandrel using any by-hand or automated composite forming methods known in the art, such as composite ply lay-up or fiber placement of composite tape or tow. Next, the composite material may be hardened or cured to form the C-shaped composite tube 25, as depicted in step 1304. Curing the composite material may include pressure and/or heat, for example by placing the mandrel and composite part in an autoclave. Once the C-shaped composite tube 25, as depicted in FIG. 5, is hardened, the mandrel may be removed from within the composite tube 25, as depicted in step 1306.

The method 1300 then comprises dividing the mandrel into a plurality of sections, thereby forming the composite tubes 26-30, as depicted in step 1308. For example, the C-shaped composite tube may be cut into three composite tubes 26-30 and trimmed to the desired lengths, with any excess composite tubing being discarded. Note that in some embodiments of the invention each of the composite tubes 26-30 may be formed independently on one or more mandrels and therefore may not require step 1308 of being divided into a plurality of sections.

As depicted in step 1310, the method 1300 may further comprise forming the metal fittings 32,34 via molding, hot extrusion operations, cutting, welding, or any fabrication methods for forming a metal part of a desired size and shape. Then the metal fittings 32,34 may be attached to the composite tubes 26-30, as depicted in step 1312. Specifically, the metal fittings 32,34 may each be sandwiched between two of the composite tubes 26-30 and bolted and/or bonded together. For example, one of the hinge beams 17 may attach to the first composite tube 26 at or proximate to the first end 48 thereof and the first end portion 70 of the first metal fitting 32 may attach to the first composite tube 26 at or proximate to the second end 50 thereof. Likewise, the second end portion 72 of the first metal fitting 32 may attach to the second composite tube 28 at or proximate to the first end 48 thereof and the first end portion 70 of the second metal fitting 34 may attach to the second composite tube 28 at or proximate to the second end 50 thereof. Additionally, the second end portion 72 of the second metal fitting 34 may attach to the third composite tube 30 at or proximate to the first end 48 thereof and one of the latch beams 18 may attach to the third composite tube 30 at or proximate to the second end 50 thereof. As described above the end portions 70,72 of the metal fittings 32,34 may slide into openings 52,54 at the ends 48,50 of the composite tubes 26-30 to be bonded or otherwise attached against the inner surface 46 of the composite tubes 26-30.

As depicted in step 1314, the method 1300 may further comprise bonding or mechanically attaching the V-blade fittings 36,38 to the composite tubes 26-30 and/or the metal fittings 32,34. For example, the first V-blade fitting 36 may be bonded or attached to the first composite tube 26 and the second V-blade fitting 38 may be attached to the third composite tube 30. The V-blade fittings 36,38 may also be formed using hot extrusion process or any other process for forming metal components. In some embodiments of the invention, the V-blade fittings 36,38 may be formed from a single V-blade fitting (not shown) cut and/or trimmed into multiple V-blade fittings 36,38.

The cowl interface flange 40 may be bonded or mechanically attached to the composite tubes 26-30 and/or the metal fittings 32,34, as depicted in step 1316. For example, the cowl interface flange 40 may be attached to the top side 56 of the composite tubes 26-30 and/or the corresponding side of the metal fittings 32,34.

The bull nose fairing 24 may attach to the composite tubes 26-30, the attachment component 42, and/or the metal fittings 32,34, as depicted in step 1318. For example, the first portion 78 of the bull nose fitting 24 may be attached to the upper inward-facing side 62 of the composite tubes 26-30 while the third portion 82 of the bull nose fairing 24 may be attached to the bottom side 58 of the composite tubes 24-30 via the attachment component 42, as described above and illustrated in FIGS. 11-12. In some embodiments of the invention, a fire-resistant coating may be applied to portions of the torque box 10a, as depicted in step 1320.

Figure 14:
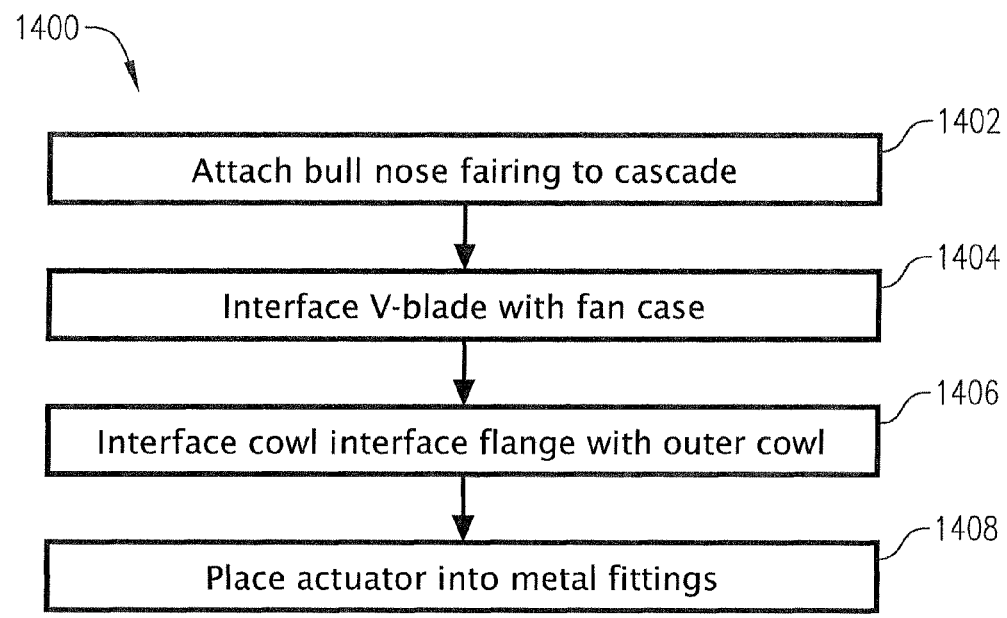
FIG. 14 is a flow chart of a method of attaching the torque box to a nacelle according to an embodiment of the present invention.

FIG. 14 illustrates method 1400 of attaching the torque box 10a to an aircraft nacelle. As mentioned above, the flow chart of FIG. 14 depicts the steps of exemplary methods of the invention in more detail. In some alternative implementations, the functions noted in the various blocks may occur out of the order depicted in FIG. 14. For example, two blocks shown in succession in FIG. 14 may in fact be executed substantially concurrently, or the blocks may sometimes be executed in the reverse order depending upon the functionality involved.

The method 1400 may comprise attaching the bull nose fairing 24 to the cascade 20 of the thrust reverser component 12a, as depicted in step 1402. For example, the second portion 80 of the bull nose fairing 24 may attach at a forward end of the cascade 20. Next, the method may comprise interfacing or attaching the V-blades 36,38 with the fan case 14, as depicted in step 1404. The cowl interface flange 40 may be interfaced with and/or attached to the outer cowl 22, as depicted in step 1406. Additionally, an actuator (not shown) may be placed into and/or attached to the inner surface 68 of the metal fittings 32,34, as depicted in step 1408.

Although the invention has been described with reference to the embodiments illustrated in the attached drawing figures, it is noted that equivalents may be employed and substitutions made herein without departing from the scope of the invention as recited in the claims. For example, while three composite tubes 26-30 and two metal fittings 32,34 are illustrated herein for each of the torque boxes 10a, 10b, the torque boxes 10a, 10b may each comprise a smaller or greater number of the composite tubes 26-30 and metal fittings 32,34 arranged in alternating succession without departing from the scope of the invention.

Having thus described various embodiments of the invention, what is claimed as new and desired to be protected by Letters Patent includes the following:

1. A hybrid torque box comprising:
    a first composite tube having a first end and a second end;
    a first metal fitting having a first end and a second end, wherein the first end of the first metal fitting is mated with the second end of the first composite tube;
    a second composite tube having a first end and a second end, wherein the first end of the second composite tube is mated with the second end of the first metal fitting; and
    wherein, the hybrid torque box attaches to both an aircraft engine fan case and a thrust reverser.

2. The torque box of claim 1, wherein the first and second composite tubes are substantially curved and configured to match a curved shape of the thrust reverser.

3. The torque box of claim 1, wherein the first metal fitting is hollow and configured to house an actuator attached to portions of the thrust reverser and configured to slide said portions of the thrust reverser in a direction away from the torque box.

4. The torque box of claim 1, further comprising:
    a second metal fitting having a first end and a second end, wherein the first end of the second metal fitting is mated with the second end of the second composite tube; and
    a third composite tube having a first end and a second end, wherein the first end of the third composite tube is mated with the second end of the second metal fitting.

5. The torque box of claim 4, further comprising:
    a first metal V-blade fitting attached to the first composite tube; and
    a second metal V-blade fitting attached to the third composite tube.

6. The torque box of claim 4, wherein the first and third composite tubes are shorter in length than the second composite tube.

7. The torque box of claim 4, further comprising a bull nose fairing attached to or integral with at least one of the first, second, and third composite tubes and the first and second metal fittings, wherein the bull nose fairing is made of composite material and configured to attach to a cascade of a thrust reverser.

8. The torque box of claim 4, further comprising a fire-resistant material applied to or integral with at least one of the composite tubes and metal fittings.

9. A nacelle of an aircraft, the nacelle comprising:
    a thrust reverser comprising a first half and a second half;
    an engine fan case;
    a first hybrid torque box comprising:
        a first composite tube having a first end and a second end,
        a first metal fitting having a first end and a second end, wherein the first end of the first metal fitting is mated with the second end of the first composite tube, and
        a second composite tube having a first end and a second end, wherein the first end of the second composite tube is mated with the second end of the first metal fitting; and
    a second hybrid torque box comprising substantially identical components and configuration as the first hybrid torque box,
    wherein the first hybrid torque box is attached to the first half of the thrust reverser, the second hybrid torque box is attached to the second half of the thrust reverser, and both the first and second hybrid torque boxes are configured to be attached to the engine fan case.

10. The nacelle of claim 9, wherein at least one of the first and second hybrid torque boxes further comprises:
    a second metal fitting having a first end and a second end, wherein the first end of the second metal fitting is mated with the second end of the second composite tube; and
    a third composite tube having a first end and a second end, wherein the first end of the third composite tube is mated with the second end of the second metal fitting.

11. The nacelle of claim 9, further comprising at least one actuator, wherein the actuator is attached to a translating portion of the thrust reverser and configured to slide the translating portion in an aft direction away from the first or second hybrid torque box, wherein the first metal fitting is hollow and configured to house the actuator.

12. The nacelle of claim 10, wherein at least one of the first and second hybrid torque boxes further comprises:
- a first metal V-blade fitting attached to the first composite tube; and
- a second metal V-blade fitting attached to the third composite tube,
- wherein the first and second metal V-blade fittings interface with the engine fan case.

13. The nacelle of claim 10, wherein the first and third composite tubes are shorter in length than the second composite tube.

14. The nacelle of claim 10, further comprising a bull nose fairing attached to or integral with at least one of the first half and the second half of the torque box, wherein the bull nose fairing is made of composite material.

15. The nacelle of claim 14, wherein the thrust reverser is a cascade thrust reverser having at least one cascade, wherein the bull nose fairing is attached to the cascade.

16. The nacelle of claim 10, wherein each half of the thrust reverser further comprises:
- a hinge beam attached to the first end of the first composite tube of at least one of the first and second torque boxes; and
- a latch beam attached to the second end of the third composite tube of at least one of the first and second torque boxes.

\* \* \* \* \*